United States Patent
Jin et al.

(10) Patent No.: US 10,516,435 B1
(45) Date of Patent: Dec. 24, 2019

(54) DETECTING FULL DUPLEX (FDX) AMPLIFIER CABLE MODEM (CM) ATTACHMENT

(71) Applicant: Cisco Technology, Inc., San Jose, CA (US)

(72) Inventors: Hang Jin, Plano, TX (US); John T. Chapman, Orange, CA (US); Tong Liu, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/183,548

(22) Filed: Nov. 7, 2018

(51) Int. Cl.
*H04M 11/00* (2006.01)
*H04B 1/56* (2006.01)
*H04L 12/26* (2006.01)

(52) U.S. Cl.
CPC .............. *H04B 1/56* (2013.01); *H04L 43/00* (2013.01); *H04L 43/08* (2013.01); *H04L 43/0811* (2013.01); *H04M 11/00* (2013.01)

(58) Field of Classification Search
CPC combination set(s) only.
See application file for complete search history.

(56) References Cited

U.S. PATENT DOCUMENTS

| | | | |
|---|---|---|---|
| 9,883,382 B2 * | 1/2018 | Thubert | H04W 12/02 |
| 9,893,917 B2 * | 2/2018 | Richardson | H04L 27/2602 |
| 2015/0215102 A1 * | 7/2015 | Reves Balleste | H04W 52/241 370/252 |
| 2017/0099662 A1 * | 4/2017 | Thubert | H04W 12/02 |
| 2017/0366288 A1 * | 12/2017 | Yokota | H04B 10/03 |
| 2018/0013810 A1 * | 1/2018 | Gordon | H04N 21/23439 |
| 2018/0176149 A1 * | 6/2018 | Cook | H04L 41/32 |

* cited by examiner

*Primary Examiner* — Linda Wong
(74) *Attorney, Agent, or Firm* — Merchant & Gould P.C.

(57) ABSTRACT

Detection of a device connected to a network element may be provided. First, upstream allocation data corresponding to the device may be received. Next, active minislot data detected at the network element may be received. It may then be determined that the upstream allocation data and the active minislot data correlate. In response to determining that the upstream allocation data and the active minislot data correlate, it may be determined that the device is attached to the network element.

20 Claims, 8 Drawing Sheets

| | CM_1 | CM_2 | ... | ... | CM_(M-1) | CM_M |
|---|---|---|---|---|---|---|
| Amp_1 | x2 | x1 | | | | |
| Amp_2 | | | | | | |
| ⋮ | | | | | | |
| Amp_(N-1) | | x2 | x1 | | x1 | |
| Amp_N | | | | x1 | x1 | |

FIG. 6

| | MS1 | MS2 | ... | ... | MS236 | MS237 |
|---|---|---|---|---|---|---|
| Amp_1 | t1_1 | t1_2 | | | t1_236 | t1-1_237 |
| Amp_2 | t2_1 | t2_2 | | | t2_236 | t2_237 |
| ... | | | | | | |
| Amp_(N-1) | tN-1_1 | tN-1_2 | | | tN-1_236 | tN-1_237 |
| Amp_N | tN_1 | tN_2 | | | tN_236 | tN_237 |

FIG. 7

DETECTING FULL DUPLEX (FDX) AMPLIFIER CABLE MODEM (CM) ATTACHMENT

TECHNICAL FIELD

The present disclosure relates generally to attachment detection.

BACKGROUND

A Hybrid Fiber-Coaxial (HFC) network is a broadband network that combines optical fiber and coaxial cable. It has been commonly employed globally by cable television operators. In a Hybrid Fiber-Coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services. Systems incorporate additional elements to transmit signals upstream from the subscriber to the distribution facility.

BRIEF DESCRIPTION OF THE FIGURES

The accompanying drawings, which are incorporated in and constitute a part of this disclosure, illustrate various embodiments of the present disclosure. In the drawings:

FIG. 6 illustrates a table of attachment;
FIG. 7 illustrates a table of minislot lagging times.

DETAILED DESCRIPTION

Overview

Figure 1:
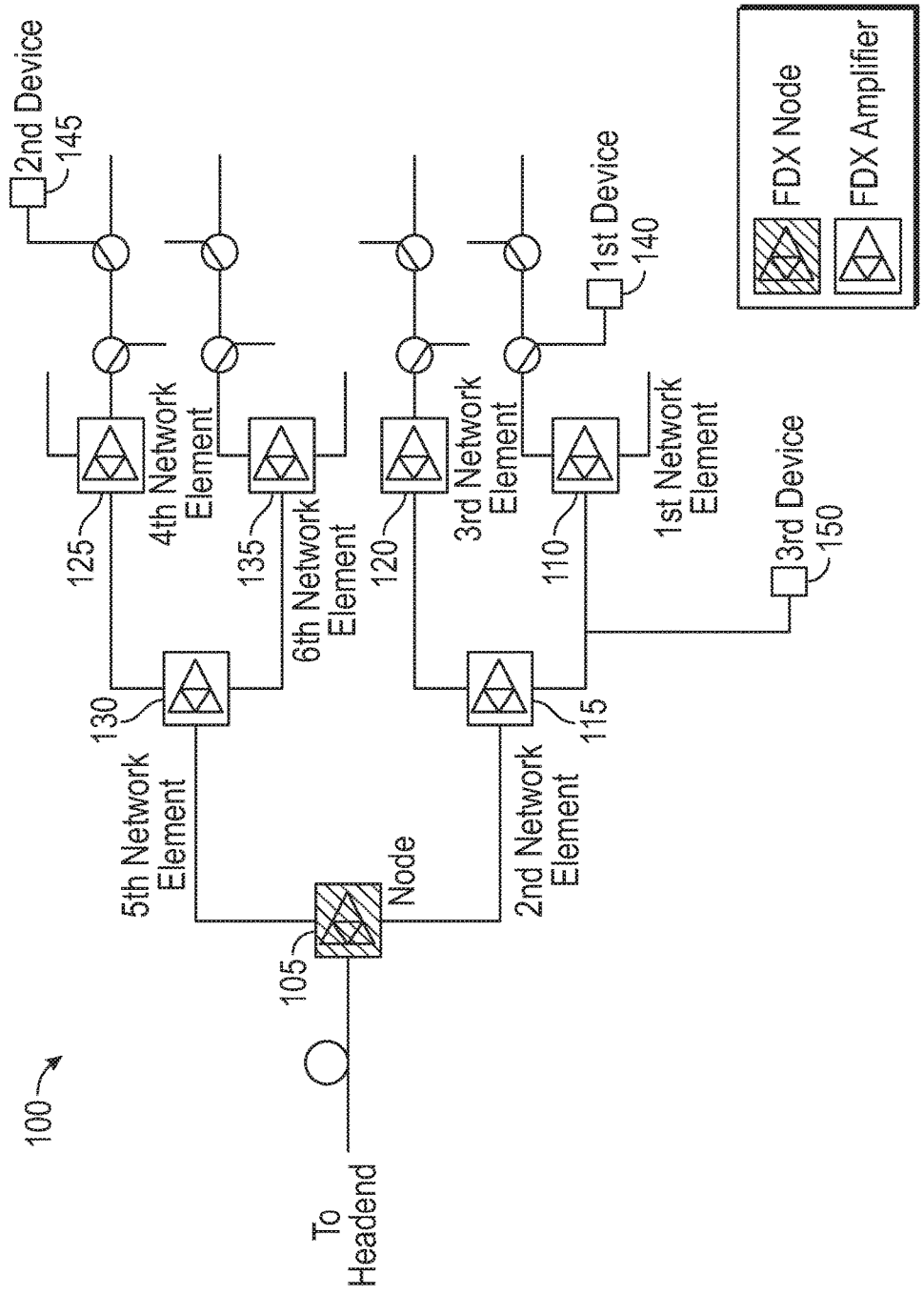
FIG. 1 is a block diagram of a communication system.

Detection of a device connected to a network element may be provided. First, upstream allocation data corresponding to the device may be received. Next, active minislot data detected at the network element may be received. It may then be determined that the upstream allocation data and the active minislot data correlate. In response to determining that the upstream allocation data and the active minislot data correlate, it may be determined that the device is attached to the network element.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Multiple-system Operators (MSOs) may comprise operators of multiple cable or direct-broadcast satellite television systems that provide content from a headend. The headend may comprise, but is not limited to, a cable television headend that may comprise a master facility for receiving television signals for processing and distribution over a cable television system. Fiber Deep (FD) may comprise a trend in which MSOs push fiber ever closer to customers to provide them with better service. In order to provide FD, many Data Over Cable Service Interface Specification (DOCSIS) compliant Hybrid Fiber-Coaxial (HFC) devices (i.e., network elements) may be deployed onto an FD HFC network. These deployed devices may comprise, for example, Full Duplex (FDX) Remote PHY (RPD) nodes and FDX amplifiers. FDX RPD nodes and FDX amplifiers may amplify bi-directional full duplex traffic on the HFC that may share frequency spectrum in both an upstream (US) direction and a downstream (DS) direction on the HFC. Non FDX RPD nodes and Non FDX amplifiers may not share frequency spectrum.

FDX amplifiers may utilize coaxial cables on both an input side and a output side. As opposed to FDX amplifiers, FDX RPD nodes may send and receive signals from an MSO headend via fiber optic cable on the input side rather than via coaxial cable, but may use coaxial cables on the output side. Accordingly, FDX RPD nodes may be located at a junction of a fiber plant and a coaxial plant in the HFC network. Furthermore, FDX RPD nodes may include remote PHY circuitry that may implement the physical layer functionality that was conventionally performed at a Cable Modem Termination System (CMTS) located at the headend operated by the MSO.

Devices may be attached to network elements in the HFC network. The devices may comprise, but are not limited to Cable Modems (CMs). The network elements may comprise, but are not limited to FDX amplifiers. The HFC network may be represented as N+M, where N stands for node (e.g., FDX RPD node), and M stands for the number of cascaded amplifiers (e.g., FDX amplifiers) following the node toward the customer premises equipment. Embodiments of the disclosure may comprise a process for detecting which FDX amplifiers that a CM is attached to in the N+M network architecture (e.g., where M>0).

Within the HFC N+M network architecture, if a CM's data path goes through an amplifier, the CM is attached to the amplifier. There may be two kinds of CM-amplifier attachments: i) direct; and ii) indirect. With direct attachment, if a CM's data path goes through an amplifier, and there are only passive devices (e.g., taps, splitters, etc.) and coax between the CM and the amplifier, the CM may be directly attached to the amplifier. With indirect attachment, a CM's data path goes through an amplifier, but the CM is not directly attached to the amplifier, it attaches to the amplifier through other amplifiers.

CM detecting may be used in proactive migration. For example, once an FDX amplifier that a CM is attached to is identified, a CMTS may migrate that CM's upstream (US) to a legacy US spectrum if the FDX amplifier needs to be downgraded from FDX operation to legacy operation. This may occur when issues are detected with an amplifier's echo canceller.

Furthermore, CM detecting may be used in equal Echo Cancellation Training (ECT). For example, FDX amplifiers may connect to an FDX node with multi-ports, so, on average, each amplifier may have <50% US minislots used. With a four port node, on average, each amplifier may see 75% US minislots un-used. Amplifiers may use the unused minislots for ECT purpose. Knowing which amplifier that a CM is attached to may help a scheduler schedule US so the unused minislots may be equally rotated, on average, cross the FDX spectrum among the amplifiers. This may allow the amplifiers to have equal or close to equal training opportunities on each minislot over time.

FIG. 1 is a block diagram of a communication system 100. As shown in FIG. 1, communication system 100 may comprise a node 105 (e.g., an FDX RPD node), a plurality of network elements, and a plurality of devices. The plurality of network elements may comprise a first network element 110, a second network element 115, a third network element 120, a fourth network elements 125, a fifth network element 130, and a sixth network element 135. The plurality of devices may comprise a first device 140, a second device 145, and a third device 150.

Node 105 may connect to a headend. The headend may comprise, but is not limited to, a cable television headend that may comprise a master facility for receiving television signals for processing and distribution over a cable television system (e.g., an HFC). Node 105 may receive downstream signals from the headend via fiber optic cable rather than via coaxial cable for example. A CMTS may be located in the headend. The CMTS may be used to provide high speed data services, such as cable Internet or Voice-Over-Internet Protocol, to subscribers. Remote physical layer (i.e., RPHY) may comprise shifting or distributing the physical layer (i.e., PHY) of a conventional cable headend CMTS to fiber nodes (e.g., node 105). Node 105 may include an RPHY device that may comprise circuitry to implement the physical layer of a CMTS.

One of the plurality of network elements may comprise, but is not limited to, amplifiers (e.g., FDX amplifiers) for example. The plurality of devices may comprise, for example, any terminal and associated equipment located at a subscriber's premises and connected with an MSO's telecommunication channel at a demarcation point. One of the plurality of devices may comprise, but is not limited to, a cable modem, a cellular base station, a tablet device, a mobile device, a smart phone, a telephone, a remote control device, a set-top box, a digital video recorder, a personal computer, a network computer, a mainframe, a router, or other similar microcomputer-based device.

Communication system 100 may be represented as N+M, where N stands for node (e.g., an FDX RPD node), and M stands for the number of cascaded network elements (e.g., FDX amplifiers) following the node toward the devices. M, for example, may be in the range of 2~10, depending on the size of the Service Group (SG). Embodiments of the disclosure may comprise a process for determining which network element a device is attached to in the N+M network architecture (e.g., where M>0). As shown in FIG. 1, while first device 140 may be attached to both first network element 110 and second network element 115, it may be directly attached to first network element 110 and indirectly attached to second network element 115. Similarly, while second device 145 may be attached to both fourth network element 125 and fifth network element 130, it may be directly attached to fourth network element 125 and indirectly attached to fifth network element 130. Third device 150 may be attached to second network element 115.

Elements shown in FIG. 1 may be practiced in hardware and/or in software (including firmware, resident software, micro-code, etc.) or in any other circuits or systems. Furthermore, elements shown in FIG. 1 may be practiced in electrical circuits comprising discrete electronic elements, packaged or integrated electronic chips containing logic gates, a circuit utilizing a microprocessor, or on a single chip containing electronic elements or microprocessors. In addition, elements shown in FIG. 1 may also be practiced using other technologies capable of performing logical operations such as, for example, AND, OR, and NOT, including but not limited to, mechanical, optical, fluidic, and quantum technologies.

Figure 2:
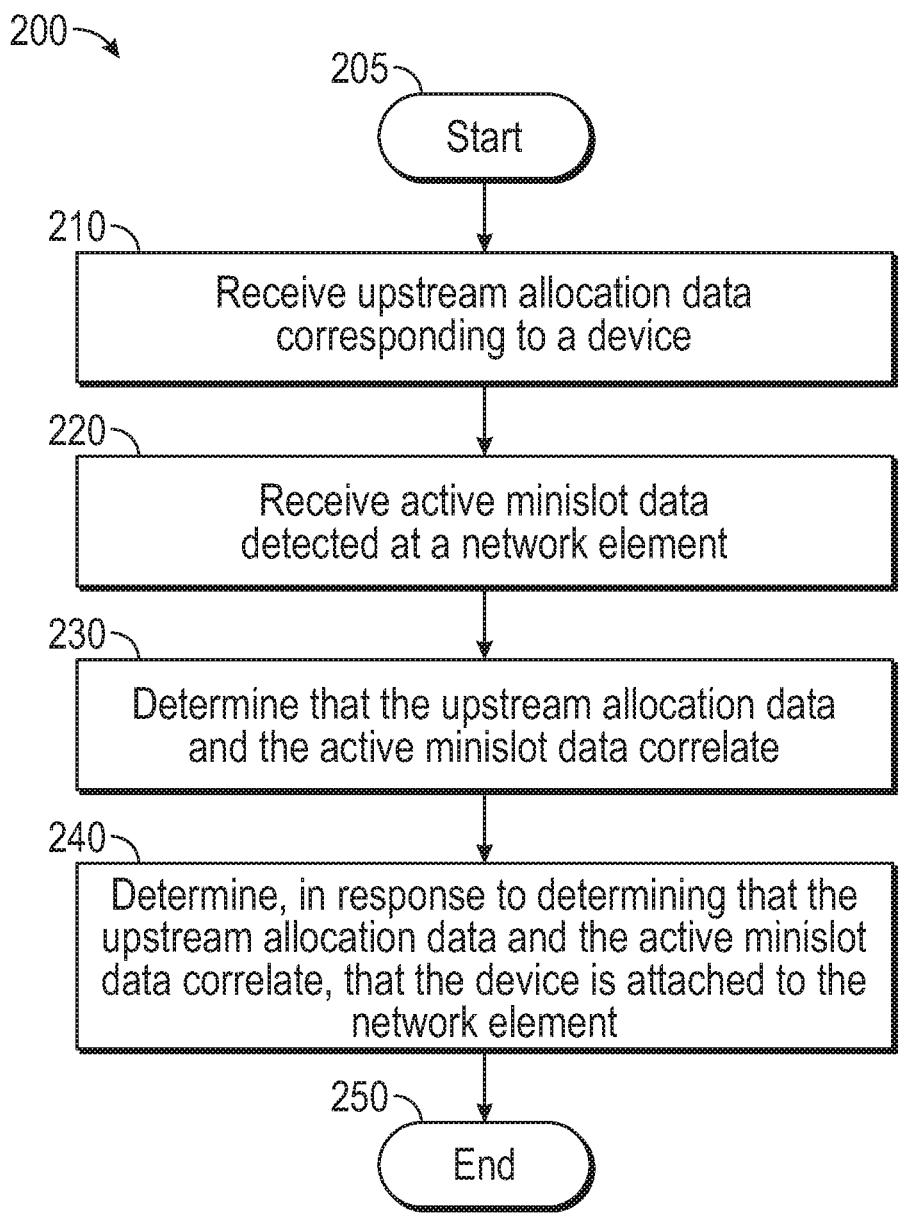
FIG. 2 is a flow chart of a method for providing detection of a device connected to an network element.

FIG. 2 is a flow chart setting forth the general stages involved in a method 200 consistent with an embodiment of the disclosure for providing detection of a device connected to a network element. Method 200 may be implemented using a computing device 800 as described in more detail below with respect to FIG. 8. Computing device 800 may be located in any element shown in FIG. 1. Furthermore, computing device 800 may be located remote from system 100, for example, in the headend or on the Cloud. Ways to implement the stages of method 200 will be described in greater detail below.

Figure 3:
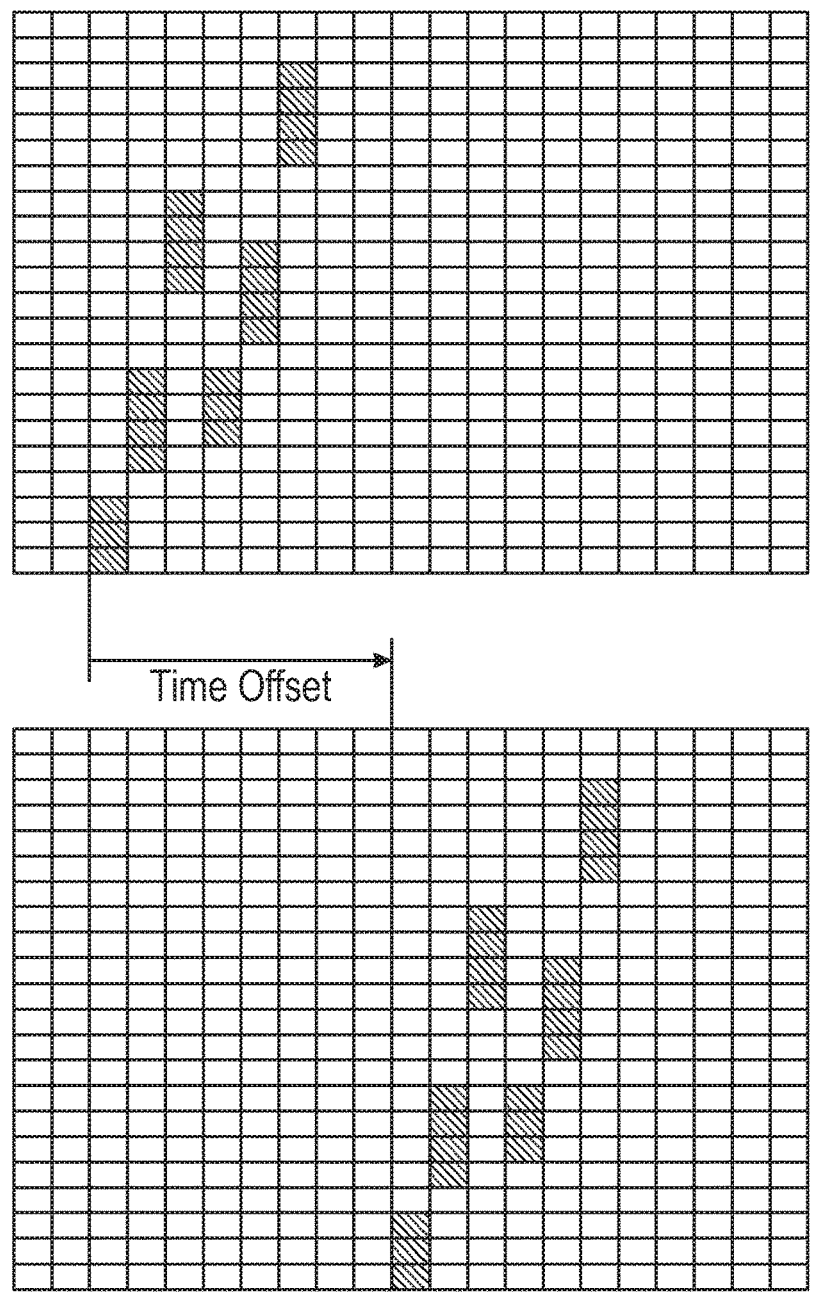
FIG. 3 illustrates a sample upstream allocation and active minislot detection.
Figure 4:
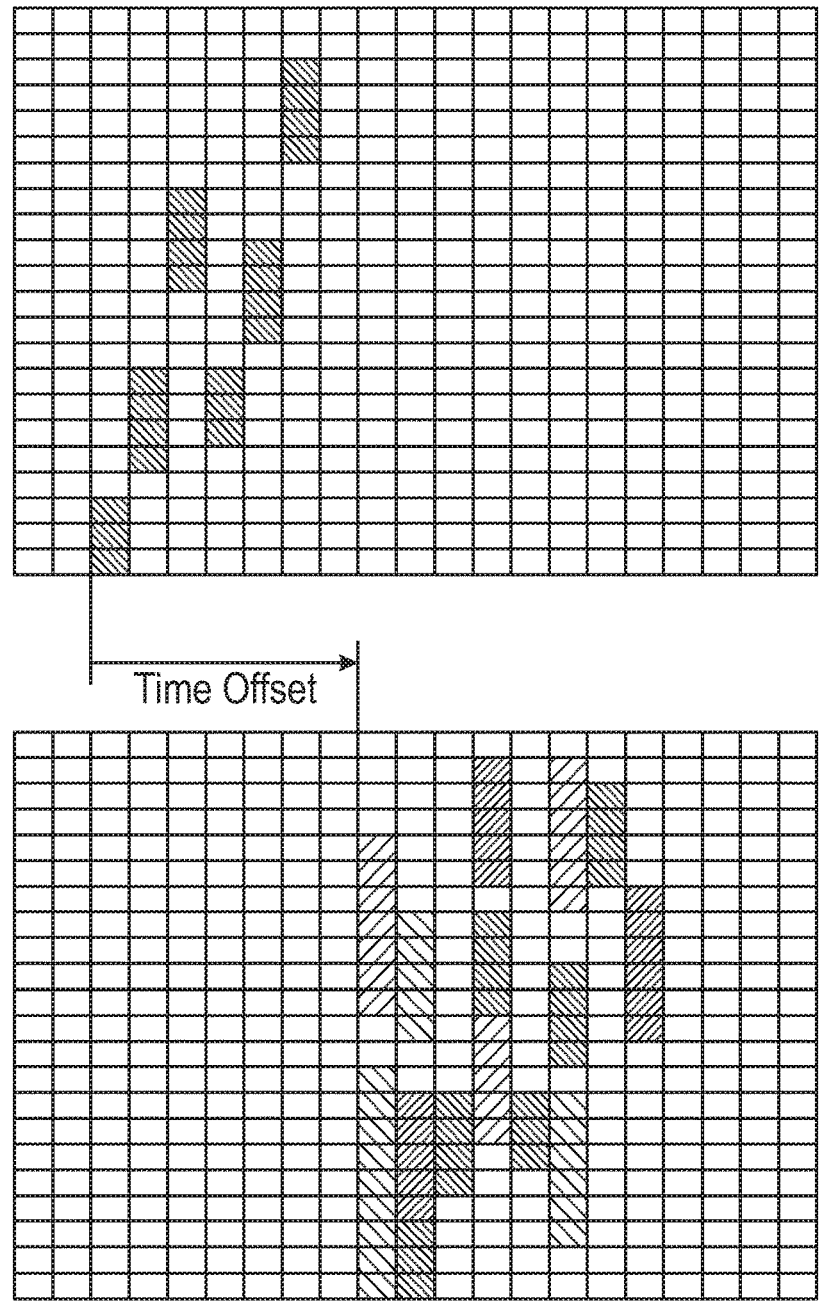
FIG. 4 illustrates a sample upstream allocation and active minislot detection.

Method 200 may begin at starting block 205 and proceed to stage 210 where computing device 800 may receive upstream allocation data corresponding to first device 140. For example, FIG. 3 and FIG. 4 illustrate a sample upstream allocation (DOCSIS MAP) for first device 140. The vertical axis may correspond to frequency and the horizontal axis may correspond to time. This allocation may be created by the CMTS at the headend. As shown in FIG. 3 and FIG. 4, a plurality of minislots may be allocated by the CMTS to first device 140 and reflected in the upstream allocation data.

From stage 210, where computing device 800 receives upstream allocation data corresponding to first device 140, method 200 may advance to stage 220 where computing device 800 may receive active minislot data detected at first network element 110. For example, FIG. 3 illustrates a sample active minislot data detected at first network element 110 where one device (e.g., first deice 140) may be attached to first network element 110. FIG. 4 illustrates a sample active minislot data detected at first network element 110 where a plurality of devices (e.g., including first device 140) may be attached to first network element 110. As shown in FIG. 3 and FIG. 4, a plurality of minislots may be detected at first network element 110 as active. The vertical axis may correspond to frequency and the horizontal axis may correspond to time.

Once computing device 800 receives the active minislot data detected at first network element 110 in stage 220, method 200 may continue to stage 230 where computing device 800 may determine that the upstream allocation data and the active minislot data correlate. For example, because first network element 110 may not have the time of day, the correlation may be checked with a sliding time axis (e.g., with a few frames off). In the example shown in FIG. 3, it may be found that first device 140 may be attached to first network element 110 because there is a correlation between the upstream allocation data (e.g. for first device 140) shown in FIG. 3 and the active minislot data (e.g., detected at first network element 110) shown in FIG. 3. Consistent with embodiments of the disclosure, the upstream allocation data and the active minislot data may correlate when all the minislots allocated in the upstream allocation data have corresponding active minislots in the active minislot data.

Consistent with embodiments of the disclosure, multiple devices may be attached to a network element. When a network element has multiple devices attach, determining correlation may be more involved. For example, in the case where a network element has multiple devices attached, the correlation between the network element and a device may be detected through encompassment. In the example shown in FIG. 4, it may be found that first device 140 may be attached to first network element 110 because there may be a correlation between the upstream allocation data (e.g. for first device 140) shown in FIG. 4 and the active minislot data (e.g., detected at first network element 110) shown in FIG. 4. Consistent with embodiments of the disclosure, the upstream allocation data and the active minislot data may correlate when all the minislots allocated in the upstream allocation data have corresponding active minislots in the active minislot data. For example, because first network element 110 may not have the time of day, the correlation may be checked with a sliding time axis (e.g., with a few frames off).

Figure 5:
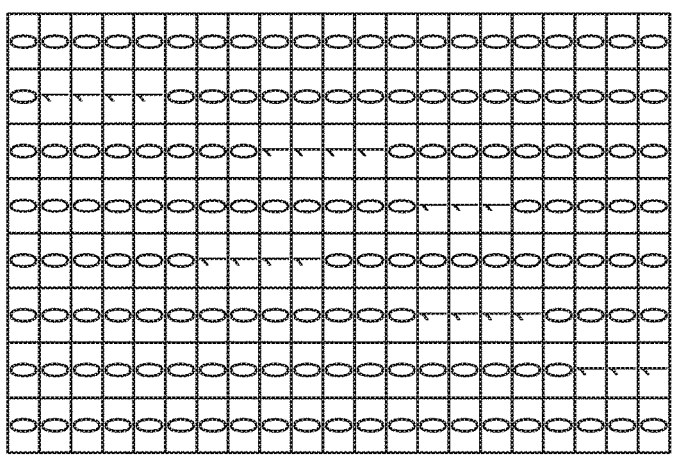
FIG. 5 illustrates a dot product of a first matrix and a second matrix.
Figure 5:
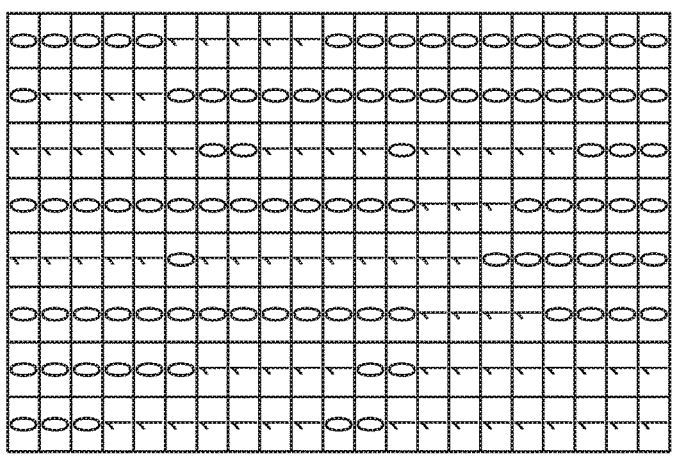

The encompassment detection of FIG. 4 may be accomplished as follows: Consider the upstream allocation data allocated to first device 140 as a two-dimensional matrix of minislots (i.e., a first matrix 505) as shown in FIG. 5. For any point in first matrix 505, if the minislots are active in the upstream allocation data, a "1" may be assign in first matrix 505, otherwise, a "0" may be assigned in first matrix 505. Similarly, a second matrix 510 may be constructed based on the active minislot data detected at first network element 110 as a two-dimensional matrix of minislots from FIG. 4 as shown in FIG. 5. Then a dot product of the two matrices (i.e., first matrix 505 and second matrix 510) may be made sliding along the time axis. If the result of the dot product equals to N at a certain point along the sliding time axis, then correlation through encompassment may be determined. N may equal the number of minislots allocated to first device 140 in the upstream allocation data. In the example shown in FIG. 5, N may equal 22. To avoid misdetection or false detection, the detection may be ran numerous times and the size of the upstream allocation may be a certain size (e.g., 20 upstream frames in time×237 minislots in frequency).

After computing device 800 determines that the upstream allocation data and the active minislot data correlate in stage 230, method 200 may proceed to stage 240 where computing device 800 may determine, in response to determining that the upstream allocation data and the active minislot data correlate, that first device 140 is attached to first network element 110. Once computing device 800 determines that first device 140 is attached to first network element 110 in stage 240, method 200 may then end at stage 250.

Consistent with embodiments of the disclosure, method 200 may be accomplished in at least two ways: i) a centric approach; and ii) a distributed approach. The centric approach may comprise the network element identifying all the active upstream minislots, and then reporting the results back to the CMTS. Then the CMTS may run the correlation between the upstream allocations (MAP) and the reported active upstream minislots. In the centric approach, the CMTS may identify which network element a device is attached to. In contrast, with the distributed approach, the CMTS may publish the upstream allocations (MAP) to the network elements. Then the network elements may identify all their active US minislots, and may run the correlation between the upstream allocations (MAP) with the detected active upstream minislots. In the distributed approach, the network elements may identify which devices are attached to them, and report this information back to the CMTS.

Consistent with embodiments of the disclosure, to facilitate the correlation/encompassment detection, the CMTS may assign a unique upstream allocation pattern. For example, a minislot index 1 may be assigned to first network device 140 during certain frames, so minislot 1 may be an indication of first network device 140 attachment. Or a probing signal may be used to indicate first network device 140. For example, decimation 8 may be used and index 1 of the probe signal may be assign to first network device 140.

Another approach may be to assigning a unique upstream allocation pattern comprising a unique two-dimensional pattern with low cross-correlation. For example, first network device 140 minislots may be allocated in such a way that the elements of the matrix derived from first network device 140 MAP follows, for example, a Pseudo-Noise (PN) sequence. The PN sequence may have a close to zero cross correlation.

Consistent with embodiments of the disclosure and referring back to FIG. 1, a device may be detected to be attached to multiple network elements. For example, first network device 140 may be detected to be attached to both first network element 110 and second network element 115 because first network device 140's upstream allocation may be encompassed by the active minislot's reported from both first network element 110 and second network element 115. While first network device 140 may be attached to both first network element 110 and second network element 115, first network device 140 may be directly attached to first network element 110, while first network device 140 may be indirectly attached to second network element 115. The attachment hierarchy may be resolved using the topology of communication system 100.

Direct attachment may be determined by using the topology of communication system 100, for example, the distance of the network elements to node 105. The distance may comprise, for example, the number of extra network elements between a current network element and node 105. For example, first network element 110 may have distance "1", and second network element 115 may have distance "0". When a device is detected to be attached to a network element chain, the network element with the longest distance may be the one that the device is directly attached. With first network device 140, both first network element 110 and second network element 115 may report their active minislot allocations, so first network device 140 may be detected as attached to both first network element 110 and second network element 115. According to the topology of communication system 100, first network device 140 may be directly attached to first network element 110 and indirectly attached to second network element 115.

In the case where the topology of communication system 100 may be unknown, the attachment hierarchy may be resolved by comparing the reported active minislots from the network elements. For any pair of network elements, there may be two possible relationships: i) superordinate and subordinate in the same amplifier chain; and ii) not share the same network element chain (e.g., non-related). As shown in FIG. 1, first network element 110 may be subordinate of second network element 115 (e.g., or second network element 115 may be superordinate of first network element 110) in the same network element chain. First network element 110 and third network element 120 may not be in the same chain (e.g., non-related).

In this situation, the relationship among network elements may be sorted by looking at the detected attached devices from all the network elements in communication system 100. If the reported attached devices from first network element 110 are a subset of the reported attached devices from second network element 115, then first network element 110 is subordinate of second network element 115 (i.e., second network element 115 is superordinate of first network element 110). If there is no overlap between the reported attached devices from first network element 110 and second network element 115, first network element 110 and second network element 115 may not be in the same chain (e.g., non-related). The topology of communication system 100 may be mapped by tracing the relationships among network elements (e.g., super/subordinate and non-related).

Figure 6:
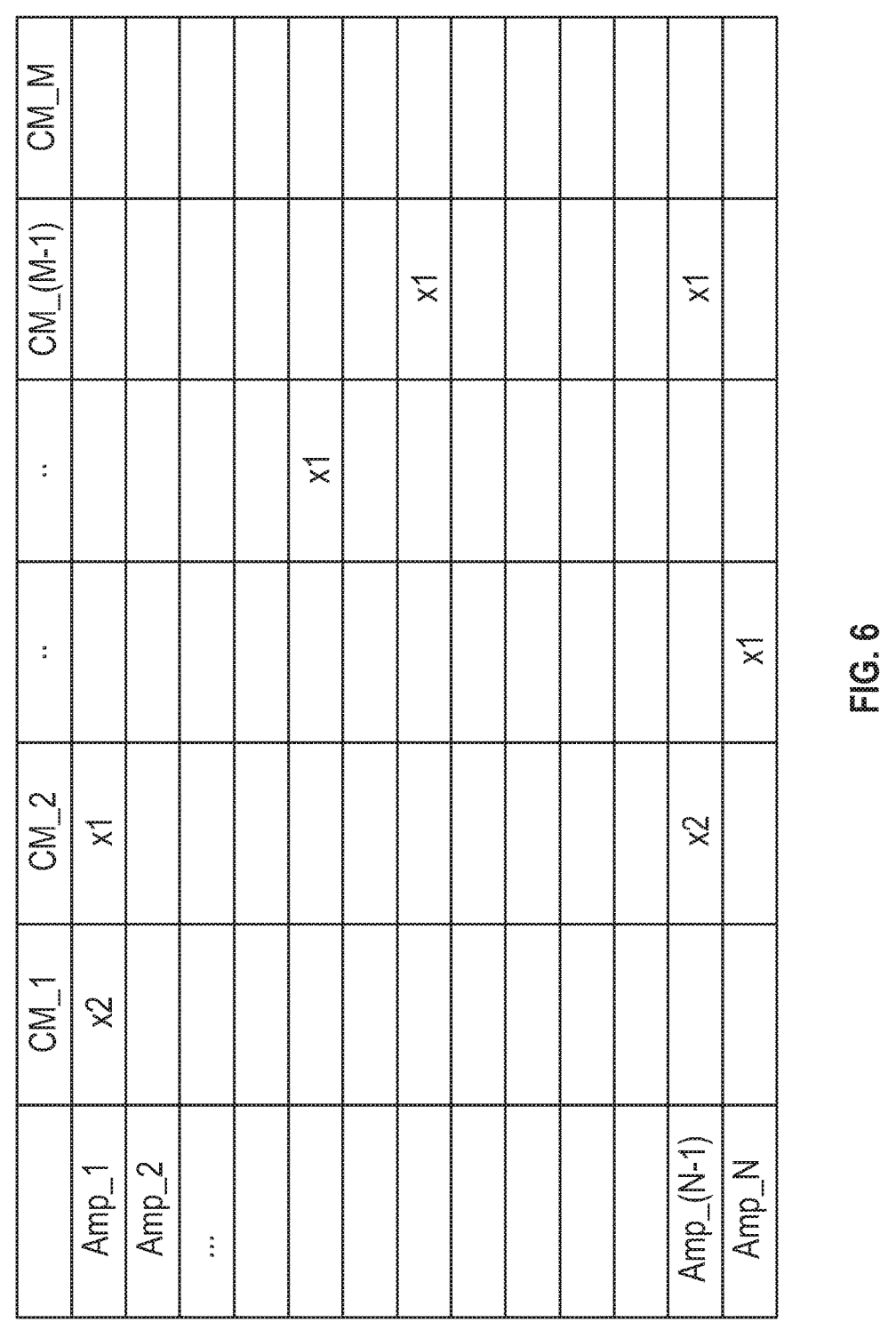

FIG. 6 illustrates a table with information that allows a scheduler in computing device 800 to spread un-assigned minislots evenly cross the plurality of network elements for ECT opportunities. The attachment of network elements and devices may be summarized in the table of FIG. 6 as follows: i) row index may comprise network element index; and ii) column index may comprise device index. For each cross point: x1 indicates an attachment, x2 illustrates a direct attachment, and empty cells illustrate no attachment. FIG. 7 illustrates a table of minislot lagging times. For each Orthogonal Frequency-Division Multiple Access (OFDMA) channel, a network element may record a lagging time for each minislot since its last EC training. As shown in FIG. 7, tn_m may comprise the lagging time for network element N for minislot M since the last time when minislot M was trained.

For each OFDM channel, the ECT opportunities may be scheduled as follows: i) from all network elements, identify the network element that contain the minislot with the longest lagging time. Denote the network element as amp_A, and the minislot as MS_A; ii) Identify all the devices that are attached to amp_A from the attachment table; iii) Unsign MS_A for all the identified devices in the next upstream scheduling cycle; iv) Set the lagging time to zero for MS_A for amp_A; and v) Go back to i). Multiple minislots may be scheduled for training purpose within each scheduling cycle.

Figure 8:
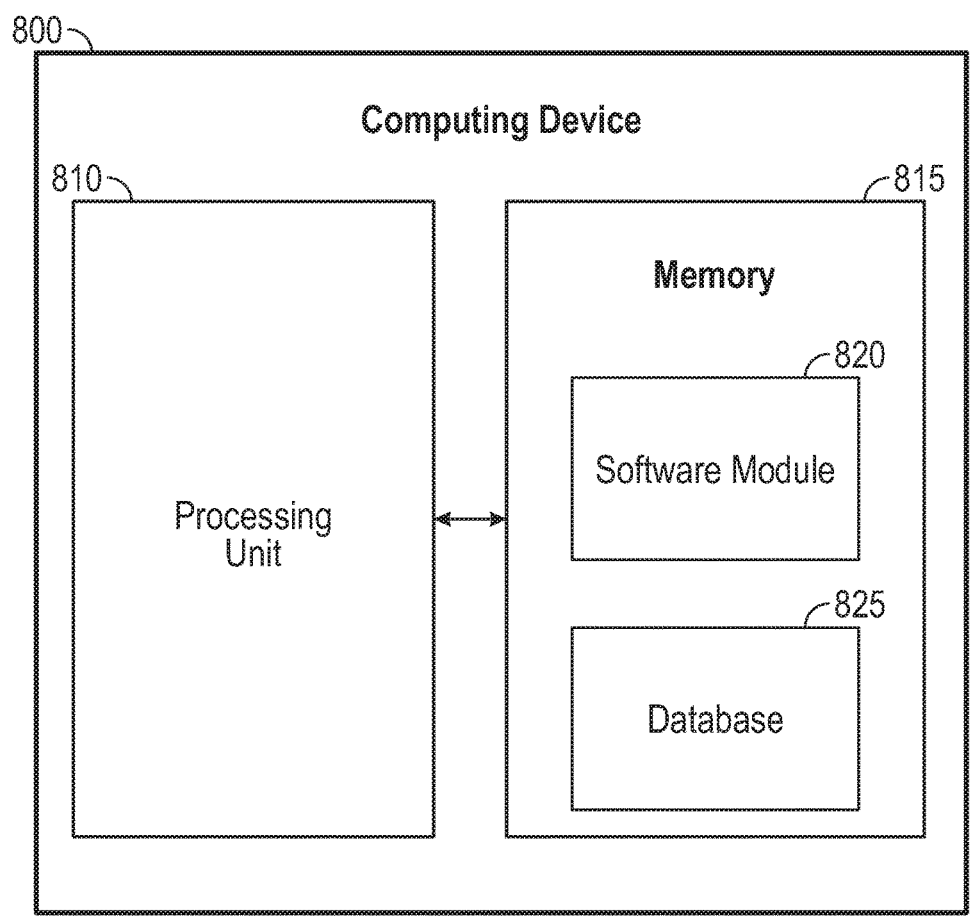
FIG. 8 is a block diagram of a computing device.

FIG. 8 shows computing device 800. As shown in FIG. 8, computing device 800 may include a processing unit 810 and a memory unit 815. Memory unit 815 may include a software module 820 and a database 825. While executing on processing unit 810, software module 820 may perform, for example, processes for providing detection of a device connected to a network element, including for example, any one or more of the stages from method 200 described above with respect to FIG. 2. Furthermore, computing device 800, for example, may provide an operating environment for any of the elements shown in FIG. 1. The elements shown in FIG. 1 may operate in other environments and are not limited to computing device 800.

Computing device 800 may be implemented using a personal computer, a network computer, a mainframe, a router, or other similar microcomputer-based device. Computing device 800 may comprise any computer operating environment, such as hand-held devices, multiprocessor systems, microprocessor-based or programmable sender electronic devices, minicomputers, mainframe computers, and the like. Computing device 800 may also be practiced in distributed computing environments where tasks are performed by remote processing devices. The aforementioned systems and devices are examples and computing device 800 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such a SOC device may include one or more processing units, graphics units, communications units, system virtualization units and various application functionality all of which may be integrated (or "burned") onto the chip substrate as a single integrated circuit. When operating via a SOC, the functionality described herein with respect to embodiments of the disclosure, may be performed via application-specific logic integrated with other components of computing device 800 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving upstream allocation data corresponding to a device;
   receiving active minislot data detected at a network element;
   determining that the upstream allocation data and the active minislot data correlate; and
   determining, in response to determining that the upstream allocation data and the active minislot data correlate, that the device is attached to the network element.

2. The method of claim 1, wherein receiving the upstream allocation data corresponding to the device comprises receiving the upstream allocation data corresponding to the device comprising a cable modem (CM).

3. The method of claim 1, wherein receiving the upstream allocation data comprises receiving the upstream allocation data from a Data Over Cable Service Interface Specification (DOCSIS) compliant MAP message.

4. The method of claim 1, wherein receiving the active minislot data detected at the network element comprises receiving the active minislot data detected at the network element comprising a Full Duplex (FDX) Remote PHY (RPD) node.

5. The method of claim 1, wherein receiving the active minislot data detected at the network element comprises receiving the active minislot data detected at the network element comprising a Full Duplex (FDX) amplifier.

6. The method of claim 1, wherein determining that the upstream allocation data and the active minislot data correlate comprises comparing the upstream allocation data and the active minislot data along a sliding time axis.

7. The method of claim 6, wherein determining that the upstream allocation data and the active minislot data correlate comprises determining that all allocated minislots in the upstream allocation data have a corresponding active minislot in the active minislot data at one point along the sliding time axis.

8. The method of claim 1, wherein determining that the device is attached to the network element comprises determining that the device is attached to the network element wherein the device and the network element are disposed in a Hybrid Fiber-Coaxial (HFC) network.

9. A system comprising:
   a memory storage; and
   a processing unit coupled to the memory storage, wherein the processing unit is operative to:
      receive upstream allocation data corresponding to a device;
      receive active minislot data detected at a network element;
      determine that the upstream allocation data and the active minislot data correlate; and
      determine, in response to determining that the upstream allocation data and the active minislot data correlate, that the device is attached to the network element.

10. The system of claim 9, wherein the device comprises a cable modem (CM).

11. The system of claim 9, wherein the processing unit being operative to receive the upstream allocation data comprises the processing unit being operative to receive the upstream allocation data from a Data Over Cable Service Interface Specification (DOCSIS) compliant MAP message.

12. The system of claim 9, wherein the network element comprises a Full Duplex (FDX) Remote PHY (RPD) node.

13. The system of claim 9, wherein the network element comprises a Full Duplex (FDX) amplifier.

14. The system of claim 9, wherein the processing unit being operative to determine that the upstream allocation data and the active minislot data correlate comprises the processing unit being operative to compare the upstream allocation data and the active minislot data along a sliding time axis.

15. The system of claim 14, wherein the processing unit being operative to determine that the upstream allocation data and the active minislot data correlate comprises the processing unit being operative to determine that all allocated minislots in the upstream allocation data have a corresponding active minslot in the active minislot data at one point along the sliding time axis.

16. The system of claim 9, wherein the device and the network element are disposed in a Hybrid Fiber-Coaxial (HFC) network.

17. A computer-readable medium that stores a set of instructions which when executed perform a method comprising:
   receiving upstream allocation data corresponding to a device;
   receiving first active minislot data detected at a first network element;
   determining that the upstream allocation data and the first active minislot data correlate;
   receiving second active minislot data detected at a second network element;
   determining that the upstream allocation data and the second active minislot data correlate;
   determining that the device is directly attached to the first network element in response to determining that the upstream allocation data and the first active minislot data correlate and that the first network element has a first network element distance index greater than a second network element distance index corresponding to the second network element; and determining that the device is indirectly attached to the second network element in response to determining that the upstream allocation data and the second active minislot data correlate and that the first network element has the first network element distance index greater than the second network element distance index corresponding to the second network element.

18. The computer-readable medium of claim 17, wherein the first network element distance index indicates the number of amplifiers in a network between the first network element and a node in the network.

19. The computer-readable medium of claim 17, wherein the second network element distance index indicates the number of amplifiers in a network between the second network element and a node in the network.

20. The computer-readable medium of claim 17, wherein determining that the upstream allocation data and the first active minislot data correlate comprises:

comparing the upstream allocation data and the first active minislot data along a sliding time axis; and determining that all allocated minislots in the upstream allocation data have a corresponding active minislot in the first active minislot data at one point along the sliding time axis.

* * * * *